US 8,521,871 B2

(12) United States Patent
Bodziony et al.

(10) Patent No.: US 8,521,871 B2
(45) Date of Patent: Aug. 27, 2013

(54) SYSTEM AND METHOD FOR MERGING MONITORING DATA STREAMS FROM A SERVER AND A CLIENT OF THE SERVER

(75) Inventors: Michal Bodziony, Tegoborze (PL); Rafal Korczyk, Bielsko-Biala (PL); Stefanie Scherzinger, Boeblingen (DE); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 12/943,906

(22) Filed: Nov. 10, 2010

(65) Prior Publication Data

US 2011/0167148 A1 Jul. 7, 2011

(30) Foreign Application Priority Data

Jan. 4, 2010 (EP) .................................... 10150005

(51) Int. Cl.
*G06F 15/173* (2006.01)
(52) U.S. Cl.
USPC .......................................... 709/224; 709/231
(58) Field of Classification Search
USPC .................................................. 709/224, 231
See application file for complete search history.

(56) References Cited

U.S. PATENT DOCUMENTS

| 6,785,673 | B1* | 8/2004 | Fernandez et al. ..................... 1/1 |
| 7,779,122 | B2* | 8/2010 | Butler et al. ................... 709/224 |
| 8,126,870 | B2* | 2/2012 | Chowdhuri et al. .......... 707/713 |
| 2006/0218123 | A1* | 9/2006 | Chowdhuri et al. ............... 707/2 |
| 2009/0171927 | A1* | 7/2009 | Nesamoney et al. ............. 707/4 |
| 2010/0227595 | A1* | 9/2010 | Johnson et al. ............ 455/414.1 |
| 2010/0235748 | A1* | 9/2010 | Johnson et al. ................ 715/730 |
| 2010/0287158 | A1* | 11/2010 | Toledano et al. ............. 707/718 |

OTHER PUBLICATIONS

"SQL at SQL Book", http://www.sqlbook/SQL/?OUter-Join-39. aspx, SQLBook.com 2007.
Scherzinger, S. et. al., "End-to-End Performance Monitoring of Databases in Distributed Environments," in Proc. BTW, 2009.
Nesime Tatbul et al., "Window-aware Load Shedding for Aggregation Queries over Data Streams," VLDB '06, Sep. 1215, 2006, Seoul, Korea.
Tolga Urhan et al., "XJoin: A Reactively-Scheduled Pipelined Join Operator," Bulletin of the IEEE Computer Society Technical Committee on Data Engineering, 2000.

(Continued)

*Primary Examiner* — Brian P Whipple
(74) *Attorney, Agent, or Firm* — North Shore Patents, P.C.; Michele Liu Baillie (57) ABSTRACT

A method, system, and computer program product for merging monitoring data streams includes: receiving a first monitoring data stream relating to a server containing first records, each first record has a first transaction identifier relating to a first transaction and first monitoring data, relating to a performance of executing the first transaction; receiving a second monitoring data stream relating to a client containing second records, each second record has a list of second transaction identifiers relating to one or more second transactions and second monitoring data, relating to a performance of executing the second transactions; buffering at least parts of the first and the second monitoring data streams; and merging the buffered first and second monitoring data streams by computing an outer-join with a join-condition that the first records have the first transaction identifier that occurs in the list of second transaction identifiers to provide a merged data stream.

25 Claims, 2 Drawing Sheets

(56) References Cited

OTHER PUBLICATIONS

Utkarsh Srivastava et al., "Memory-Limited Execution of Windowed Stream Joins," Proceedings of the 30th VLDB Conference, Toronto, Canada, 2004.

Prakash M. Nadkarni, "Chronomerge: An Application for the Merging and Display of Multiple Time-Stamped Data Streams," Computers and Biomedical Research 31, 451-464 (1998), Article No. CO981492.

"Join (SQL)", http://en.wikipedia.org/wiki/Join_(SQL)#Full_outer_join, Wikipedia; Nov. 30, 2010.

"Optim Performance Manager Extended Edition for DB2 for Linux, UNIX and Windows", http://www-01.ibm.com/software/data/studio/performance-expert-luw/; Nov. 30, 2010.

Theodore Johnson, "How to Build a Stream Database," AT&T Labs—Research; Apr. 23, 2002.

* cited by examiner

FIG. 2

(12)  United States Patent US 8,521,871 B2

SYSTEM AND METHOD FOR MERGING MONITORING DATA STREAMS FROM A SERVER AND A CLIENT OF THE SERVER

CROSS-REFERENCE TO RELATED APPLICATIONS

The present application relates to European Patent Application No. 10150005.6, filed on Jan. 4, 2010.

BACKGROUND

Conventionally, a database server is connected to one or more database clients. These clients communicate with the server, e.g. via a network or an inter-process communication. The clients access the server by issuing a request to the server. A request may comprise demands for reading and/or writing data to the server. The server may be a database server that comprises plural partitions. In this application, the term "database node" may be equally exchangeable to "database partition", as known from the prior art. A coordinator node is a dedicated node which coordinates the execution of database workload across the complete set of nodes.

The user of the client usually demands virtually instant access to the database server in order to perform his tasks. However, plural instances may occur, in which the data transfer between server and client is not fast enough. In this case, the user may complain to the responsible database administrator about the lagging performance of the database. The database administrator must now locate in a reasonable amount of time the reasons for the performance problems of the database server and client connection. However, locating the source of the performance problems may be a serious challenge in a distributed network.

The lagging response time of the clients and servers may be due to several different reasons. In particular, the application, the application server, the driver, the network, the database and the operating system contribute to the response time. There exist a variety of dedicated tools for monitoring each of these layers, such as for monitoring the performance of the operating system, the network traffic, or the database itself. Yet when the layers are observed in isolation, a considerable amount of time has to be spent on manually consolidating the views of different tools. In case of an urgent problem, the database administrator must identify the root cause reliably and fast. In addition, both data streams from the server and client are de-coupled, hence they are recorded asynchronously. Furthermore, monitoring data that arrives at the monitoring server may be incomplete. Finally, the data streams may represent the client and server performance data with different granularity.

BRIEF SUMMARY

In one embodiment of the present invention, a method for merging monitoring data streams from a server and at least one client of the server, comprises: receiving a first monitoring data stream comprising a plurality of first records, each first record comprising a first transaction identifier and first monitoring data, the first transaction identifier relating to a first transaction, and the first monitoring data relating to a performance of executing the first transaction, the first monitoring data stream relating to the server; receiving a second monitoring data stream comprising a plurality of second records, each second record comprising a list of second transaction identifiers and second monitoring data, the list of second transaction identifiers relating to one or more second transactions, and the second monitoring data relating to a performance of executing the second transactions, the second monitoring data stream relating to the at least one client; buffering at least parts of the first monitoring data stream and the second monitoring data stream; and merging the buffered first monitoring data stream and second monitoring data stream by computing an outer-join with a join-condition that the first plurality of records from the first monitoring data stream have the first transaction identifier that occurs in the list of second transaction identifiers of the plurality of second records from the second data monitoring data stream to provide a merged data stream.

In one aspect of the present invention, the method further comprises: splitting the merged data stream into at least two streams, the at least two streams comprising a stream of matched records from the first monitoring data stream and the second monitoring data stream.

In one aspect of the present invention, the splitting the merged data stream into the at least two streams, the at least two streams comprising the stream of the matched records from the first monitoring data stream and the second monitoring data stream comprises: splitting the merged data stream into three streams comprising: a first stream with unmatched records from the first monitoring data stream, a second stream with matched records from the first and second monitoring data streams, and a third stream with unmatched records from the second data stream.

In one aspect of the present invention, the method further comprises: aggregating records of the at least two streams independently to provide aggregate records comprising aggregated monitoring data.

In one aspect of the present invention, the buffering of at least parts of the first monitoring data stream and the second monitoring data stream comprises: buffering the first monitoring data stream and the second monitoring data stream for a predetermined time period.

In one aspect of the present invention, the buffering of at least parts of the first monitoring data stream and the second monitoring data stream comprises: buffering the first monitoring data stream and the second monitoring data stream for an adjustable time period.

In one aspect of the present invention, the buffering of at least parts of the first monitoring data stream and the second monitoring data stream comprises: buffering the first monitoring data stream and the second monitoring data stream at most for a predetermined time period, wherein the matched records from the first monitoring data stream and the second monitoring data stream are removed from the buffer when the matched records are found.

In one aspect of the present invention, the first monitoring data stream comprises first connection attributes and first performance metrics.

In one aspect of the present invention, the second monitoring data stream comprises second connection attributes and second performance metrics.

In one aspect of the present invention, wherein the server comprises a plurality of partitions, wherein the receiving the first monitoring data stream comprising the plurality of first records, each first record comprising a first transaction identifier and first monitoring data, the first transaction identifier relating to a first transaction, and the first monitoring data relating to a performance of executing the first transaction, the first monitoring data stream relating to the server, comprises: receiving the first monitoring data stream comprising the plurality of first records, each first record comprising the first transaction identifier, a partition identifier, and the first monitoring data, the first transaction identifier relating to the first transaction, the partition identifier relating to the partition on which the first transaction has been executed, the first monitoring data relating to the performance of executing the first transaction on the partition, the first monitoring data stream relating to the server; wherein the merging of the buffered first monitoring data stream and second monitoring data stream by computing an outer-join with a join-condition that the first plurality of records from the first monitoring data stream have the first transaction identifier that occurs in the list of second transaction identifiers of the plurality of second records from the second data monitoring data stream to provide a merged data stream, comprises: pre-processing the buffered first monitoring data stream by generating a pre-processed first monitoring data stream, pre-aggregating the pre-processed first monitoring data stream by aggregating by the first transaction identifier to abstract away from partition-specific level-of-detail in the first monitoring data for yielding a pre-processed and pre-aggregated first data stream, and processing the pre-processed and the pre-aggregated first data stream and the buffered second data stream.

System and computer program products corresponding to the above-summarized methods are also described and claimed herein.

BRIEF DESCRIPTION OF THE SEVERAL VIEWS OF THE DRAWINGS

Preferred embodiments of the invention are illustrated in the accompanied figures. These embodiments are merely exemplary, i.e. they are not intended to limit the content and scope of the appended claims.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
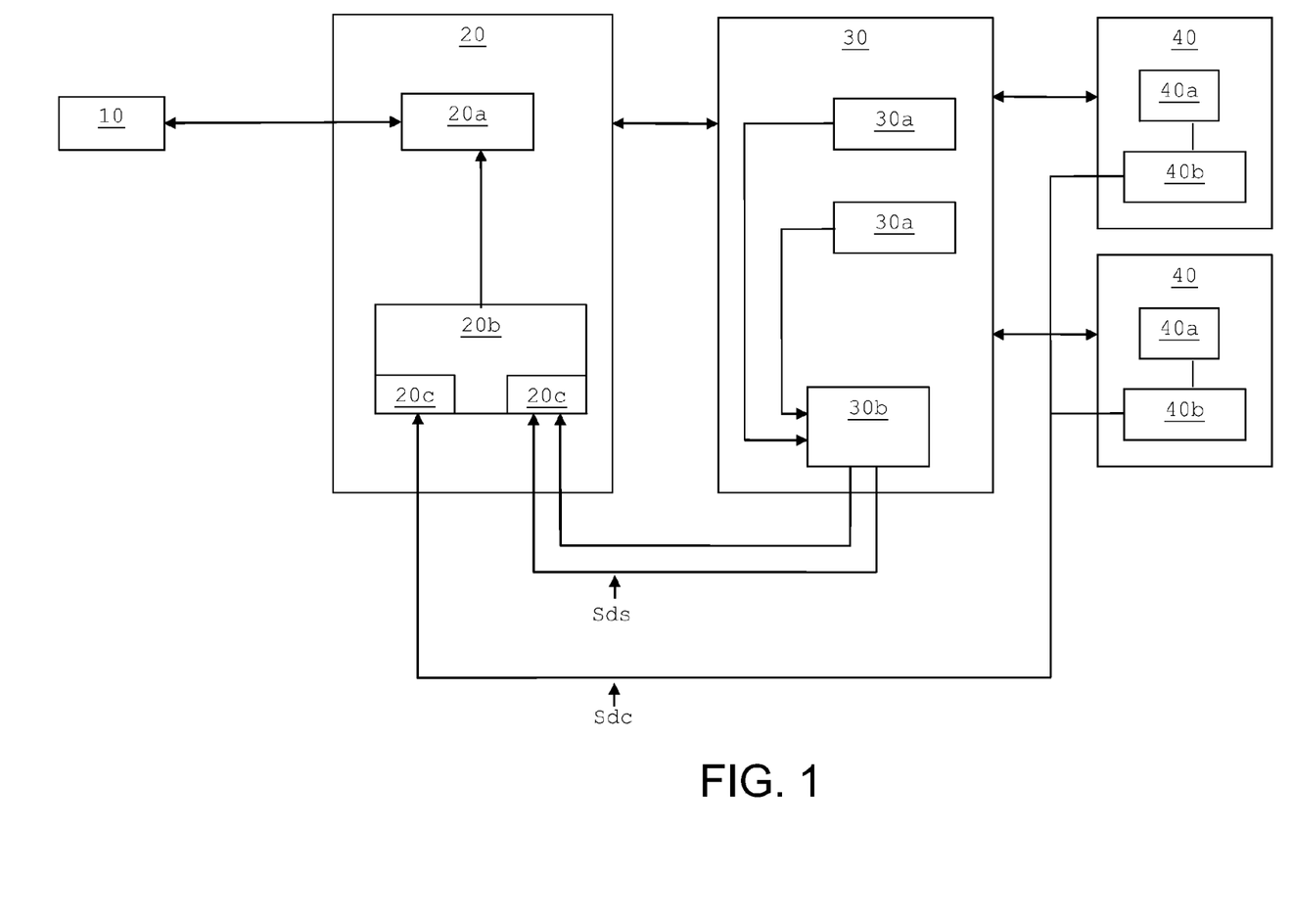
FIG. 1 is a block diagram illustrating a server and clients connected via a network as well as a system for merging monitoring data streams from a server and a client of the server according to an embodiment of the present invention.

FIG. 1 shows a client/server configuration, which comprises a server 30. The server 30 is preferably a database server. Two clients 40 are shown. These clients 40 are connected to the server 30. The clients 40 access the server 30 by issuing a request to the server 30. In case of a database server 30, the request may comprise demands for reading and/or writing data to the server 30. The clients 40 and server 30 are connected to each other via a network. Clients 40 and server 30 form a standard client/server configuration.

Additionally, FIG. 1 illustrates an embodiment of a monitoring server 20. This monitoring server 20 is used by the administrator in order to detect performance issues in the server/client network configuration. Therefore, the monitoring server 20 is connected to both the monitored database 30 and the database clients 40. The administrator has access to the monitoring server 20 via a monitoring graphical user interface (GUI) 10. The monitoring server comprises a performance database 20a as well as a merging and aggregating means 20b. Two input buffers 20c retain the incoming records. On a regular basis, the buffers are flushed and the data is passed on to the merging and aggregating means 20b. The performance database 20a contains the monitoring data, such as connection attributes, and first and/or second performance metrics. The administrator has access to the merged and aggregated data of the performance database 20a via the monitoring GUI 10.

The monitored database server 30 comprises plural database nodes 30a. FIG. 1 merely shows two such nodes, however many more nodes may be present in the database server 30. Each database node 30a is connected to a database event monitor 30b, which is responsible for monitoring the performance of the particular database nodes 30a. The database clients 40 each comprise a client monitoring agent 40b for monitoring client applications 40a. Both the client monitoring agent 40b and the database event monitor 30b collect monitoring data concurrently and stream the monitoring data to the monitoring server 20. The monitoring data from the server 30 is called data server stream Sds. The monitoring data from the client 40 is called data client stream Sdc.

The merging and aggregating means 20b according to the present invention must cope with the following paradox: The data server stream Sds and the data client stream Sdc essentially describe the performance of the same database workload. However, the monitoring data is collected at different layers in the database stack, which results in two independent data streams Sds and Sdc. The records in the data streams Sds and Sdc are provided at different levels of granularity. Both data streams Sds and Sdc are de-coupled, hence they arrive asynchronously at the monitoring server 20. Finally, monitoring data that arrives at the monitoring server 20 may be incomplete.

This makes it challenging to match records between the streams. For instance, the records in the data client stream Sdc are already pre-aggregated, whereas the records in the data server stream Sdc break down the execution of the database workload on the level of single transactions. The records are further broken down to the level of single database nodes.

In correlating records from both streams Sds and Sdc, the records from the data server stream Sds are matched against records in the data client stream Sdc. The data client stream Sdc already contains pre-aggregated records.

The merging and aggregating means 20b must be capable of correlating both monitoring data streams Sds and Sdc in order to obtain a holistic view on the performance of database workload execution. Large volumes of monitoring data should be managed, while keeping a low footprint on the monitored database. Load shedding should be avoided in order to allow for ad-hoc queries on the collected data. The data streams should be handled with low latency.

Figure 2:
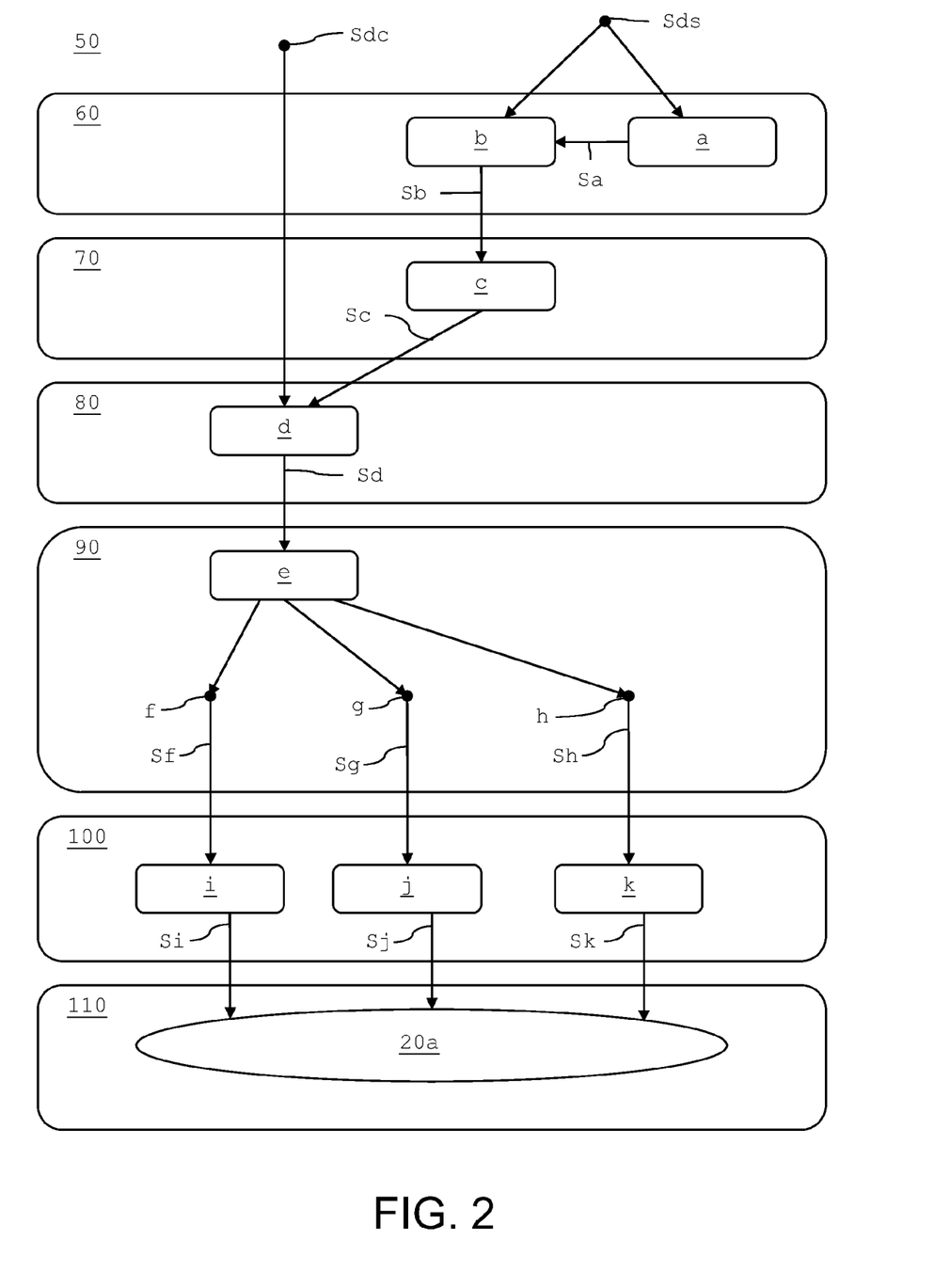
FIG. 2 is a flowchart illustrating a method for merging monitoring data streams from a server and a client of the server according to an embodiment of the present invention.

Referring now to FIG. 2, an embodiment of the method for merging monitoring data streams Sdc, Sds from a server 30 and a client 40 of the server 30 is described. FIG. 2 represents a flowchart. Each block in the flowchart may represent a module, segment, or portion of code, which comprises one or more executable instructions for implementing the specified logical function. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 2 illustrates a data flow graph with different kinds of nodes. The sources in this data flow graph are the incoming data client stream Sdc and the data server stream Sds. They are denoted by opaque circles with one outgoing edge. Opaque circles with one incoming edge and one or more outgoing edges, i.e. reference signs f, g and h, represent a copy operator, where the records arriving on the incoming data stream are duplicated into one or more outgoing data streams. Boxes denote data transformation stages. The boxes are labeled with alphabetic identifiers (a) through (e) and (i) through (k). The data stream leaving a box (i) is identified as Si. The sink in FIG. 2 is the performance database 20a, where the output of the merge operation is stored. Arrows show the data flow between nodes and boxes in the graph.

The first step in the method illustrated in FIG. 2 comprises the step of monitoring data streams during one buffer interval 50. A server data stream Sds and a client data stream Sdc is being recorded or buffered during the buffer interval.

The following step 60 includes preprocessing the data server stream Sds. The step encompasses the extraction of connection attributes from coordinator nodes. Within step 60, the method performs the transformation stage b of enhancing the received records with the extracted attributes from transformation stage a. In the preprocessing phase, records from the data server stream Sds are processed. In this stream Sds, only those records that stem from a coordinator node carry actual values for the connection attributes. In the preprocessing phase, these connection attributes are propagated to all records that belong to the respective coordinator node.

In the following step 70, the enhanced data record is pre-aggregated. In this way, the amount of data to be processed is reduced. The server stream is aggregated in order to remove partition-specific data.

In step 80, the data client stream Sdc and the pre-aggregated data server stream Sc are merged. In the merge phase, an outer join between records from the data client stream Sdc and records originating from the data server stream Sds is computed.

Thereafter, in step 90, the merged data stream Sd is split into three separate streams Sf, Sg and Sh. During the splitting phase three kinds of records are distinguished from each other. The outer join produces matched records, unmatched data client records, and unmatched data server records. The data stream Sg comprises the stream of matched records. Reference sign Sf denotes the stream of unmatched data client records; reference sign Sh denotes the stream of unmatched data server records. Matched records Sg are records from the client and server stream, which relate to the same transactions. Since some transactions may not be terminated on the client or server during the buffering interval, there may exist unmatched records from the server or client.

In the final aggregation phase 100, information specific to single transactions is removed. In step i unmatched data client records are reformatted. In step j matched data records are aggregated across transactions. In step k, unmatched data server records are aggregated in order to remove transaction-specific data, i.e. in order to decrease the granularity of data, by abstracting away from the level of single transactions.

Finally, the data insertion step 110 is performed. The records are inserted into the performance database 20*a*.

Below the semantics of a transformation are described using an SQL-like notation. The actual implementation need not be based on SQL, but can be done in any programming language. SQL is merely used, since it is well-known in the database domain, and is well-suited as a declarative means to formulate semantics independently.

Monitoring Data Streams

The data client stream is labeled as input stream Sdc, while the data server stream is labeled input stream Sds. For simplicity, only the records that arrive within the same time window are discussed. Therefore, timestamps may be ignored. Yet of course, the merge operator employs pipelining, and processes batch after batch of data that has arrived within its given time window.

For the sake of simplicity, the following abstract view on the structure of records from the data client stream is provided:

The connection attributes connection_attributes,
the time-spent metrics collected by the data client, agg_d-c_metrics, which have already been pre-aggregated, and
the list of transaction identifiers txt_id_list, identifying the transactions that have been aggregated into this record.

The structure of records from the data server stream is defined as follows:

The transaction identifier txt_id,
the database node on which this part of the workload has been executed node_id,
the database node that acts as the coordinator node, coord_node_id,
the connection attributes connection_attributes; they are only provided if node_id=coord_node_id, i.e. the given node is the coordinator node; otherwise, the connection attributes are all set to NULL,
the actual data server performance metrics ds_metrics.

Preprocessing Phase for the Data Server Stream

Connection attribute values are only delivered for records produced at the coordinator node. For all nodes that are not coordinator nodes, the connection attributes are set to NULL. In the first phase, the connection attributes from the coordinator nodes are also attached to those records that do not originate on the coordinator node. This is done in two steps. Operator a retrieves the transaction identifier and connection attributes from records that stem from the coordinator node. This produces the data stream Sa.

Select txt_id, coord_node_id, connection_attributes
From stream Sds
Where node_id=coord_node_id Operator b joins the correct connection attributes to all records from all nodes. This produces the data stream Sb.

Select Sa.txt_id, Sa.connection_attributes, Sds.node_id, Sds.ds_metrics
From stream Sa, stream Sds
Where Sa.txt_id=Sds.txt_id In partitioned databases, the workload for one transaction is executed across several partitions. Note that in exceptional and unlikely cases, the buffer window may not be large enough to contain all these records that belong to the same transaction. As a consequence, the input to the merger operator may contain records with a certain value for a coordinator node identifier, but no matching record where the node identifier is exactly this coordinator node identifier. These records have only NULL values for connection attributes, but the connection attributes are vital in identifying and aggregating records. As it makes little sense to process these records further inside the merger, they are simply discarded.

Pre-Aggregation Phase for the Data Server Stream

The pre-aggregation phase concerns the data server stream only. An aggregation to abstract away from partition-specific information is applied. The corresponding operator in FIG. 2 carries the label c. It takes the data server stream Sb as input, and outputs a new stream of records labeled Sc.

Below, this aggregation is described using an SQL-like notation. The aggregation of records in ds_metrics depends on the type of metric, e.g. counters are merely summed up, while for gauges, the high-watermark is determined.

Select txt_id, connection_attributes,
aggregation(ds_metrics) as preagg_ds_metrics
From stream Sb
Group by txt_id, connection_attributes Join Phase In the join phase, a full outer join between the data client streams Sdc and the pre-aggregated data server stream Sc is computed. The operator in FIG. 2 is labeled operator d, and accordingly the outcome is identified as stream Sd. The semantics of this join are specified below. The join predicate is a test for list membership.

Select Sdc.connection_attributes as Sdc_connection_attributes,
Sc.connection_attributes as Sds_connection_attributes,
Sdc.txt_id_list, Sc.txt_id,
Sdc.agg_dc_metrics, Sc.preagg_ds_metrics
From stream Sds outer join stream Sc
on (Sc.txt_id in Sdc.txt_id_list)

The output stream carries two versions of the connection attributes, namely those that stem from the data client stream and those that stem from the data server stream.

Splitting Phase

In the splitting phase, the records from stream Sd are split into three streams that undergo separate processing. Stream Sf contains all records that originate from the data client stream and that could not be matched in the join phase. Stream Sg contains all records that could be matched in the join phase.

Finally, stream Sh contains all records that originate from the data server stream and that could not be matched in the join phase. Consequently, the values for Sdc_connection_attributes are NULL. However, the connection attributes are provided as Sds_connection_attributes, due to the preprocessing phase for the data server stream records.

Aggregation Phase

In the aggregation phase, records are aggregated in order to abstract away from information that is specific to single transactions. As a result of aggregation, three data streams are generated that have the same structure:

values for the connection attributes connection_attributes,
optional values for data client metrics in agg_dc_metrics,
optional values for data server metrics in agg_ds_metrics,
the value number_of_txt_ids by counting the number of records that have been aggregated into a single record in this operation. This value is useful for normalizing values during ad-hoc queries on the performance data.

Stream Sf is processed by the operator labeled i. The mapping of incoming and outgoing records is 1:1. The value for number_of_txt_ids is computed by counting the number of transaction identifiers in the list txt_id_list. As no matching records from the data server stream have been found, the values for agg_ds_metrics are all set to NULL.

Select Sdc_connection_attributes as connection_attributes,
   agg_dc_metrics,
   NULL values for agg_ds_metrics,
   count(txt_id_list) as number_of txt_ids
From stream Sf
Group by connection_attributes, agg_dc_metrics Stream Sg is processed by the operator labeled j. Again, the aggregation over the columns summarized as preagg_ds_metrics is specific to the column types.

Select Sdc_connection_attributes as connection_attributes,
   agg_dc_metrics,
   aggregation(preagg_ds_metrics) as agg_ds_metrics,
   count(txt_id) as number_of_txt_ids
From stream Sg
Group by connection_attributes, agg_dc_metrics Stream Sh contains records that originate from the data server stream and that could not be matched with any records from the data client stream. The records in stream Sh (see operator k) are aggregated again to abstract away from information that is specific to single transactions. The connection attributes are provided within Sds_connection_attributes, since no matching records with the data client stream were found. As a further consequence, all values for agg_ds_metrics are set to NULL.

Select Sds_connection_attributes as connection_attributes,
   NULL values for agg_dc_metrics,
   aggregation(preagg_ds_metrics) as agg_ds_metrics,
   count(txt_id) as number_of_txt_ids
From stream Sh
Group by connection_attributes Handling Unmatched Records The merge operator is responsible for correlating both monitoring data streams. Semantically, it computes a full outer join, since there may be records in either input stream for which the operator cannot find a match:

Very likely, there will be records in the data server stream that have no match in the data client stream, since not all database workload is tracked end-to-end. Let us consider the system architecture in FIG. 1. If not all data clients are equipped with a client monitoring agent, then part of the overall database workload is only captured by the data server stream.

There can be records in the data client stream that cannot be matched with records in the data server stream, as the merger operates on a time-window basis; since streams are processed, one is forced to employ a window-based approach; due to delays in the network it is possible that the matching data does not arrive in time. Naturally, the same effect can be observed for records in the data stream where the time window for finding matching records expires.

After the time-window has expired, any unmatched data is also aggregated and stored in the performance database. The motivation is that this data also contains valuable insights.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method for merging monitoring data streams from a server and at least one client of the server, comprising:
receiving a first monitoring data stream comprising a plurality of first records, each first record comprising a first transaction identifier and first monitoring data, the first transaction identifier relating to a first transaction, and the first monitoring data relating to a performance of executing the first transaction, the first monitoring data stream relating to the server;
receiving a second monitoring data stream comprising a plurality of second records, each second record comprising a list of second transaction identifiers and second monitoring data, the list of second transaction identifiers relating to one or more second transactions, and the second monitoring data relating to a performance of executing the second transactions, the second monitoring data stream relating to the at least one client;
buffering at least parts of the first monitoring data stream and the second monitoring data stream; and
merging the buffered first monitoring data stream and second monitoring data stream by computing an outer-join with a join-condition that the first plurality of records from the first monitoring data stream have the first transaction identifier that occurs in the list of second transaction identifiers of the plurality of second records from the second data monitoring data stream to provide a merged data stream.

2. The method of claim 1, further comprising:
splitting the merged data stream into at least two streams, the at least two streams comprising a stream of matched records from the first monitoring data stream and the second monitoring data stream.

3. The method of claim 2, wherein the splitting the merged data stream into the at least two streams, the at least two streams comprising the stream of the matched records from the first monitoring data stream and the second monitoring data stream comprises:
splitting the merged data stream into three streams comprising: a first stream with unmatched records from the first monitoring data stream , a second stream with matched records from the first and second monitoring data streams, and a third stream with unmatched records from the second monitoring data stream.

4. The method of claim 2, further comprising: aggregating records of the at least two streams independently to provide aggregate records comprising aggregated monitoring data.

5. The method of claim 1, wherein the buffering the at least parts of the first monitoring data stream and the second monitoring data stream comprises:
buffering the first monitoring data stream and the second monitoring data stream for a predetermined time period.

6. The method of claim 1, wherein the buffering the at least parts of the first monitoring data stream and the second monitoring data stream comprises:
buffering the first monitoring data stream and the second monitoring data stream for an adjustable time period.

7. The method of claim 1, wherein the buffering the at least parts of the first monitoring data stream and the second monitoring data stream comprises:
buffering the first monitoring data stream and the second monitoring data stream at most for a predetermined time period, wherein the matched records from the first monitoring data stream and the second monitoring data stream are removed from the buffer when the matched records are found.

8. The method of claim 1, wherein the first monitoring data stream comprises first connection attributes and first performance metrics.

9. The method of claim 1, wherein the second monitoring data stream comprises second connection attributes and second performance metrics.

10. The method of claim 1,
wherein the server comprises a plurality of partitions,
wherein the receiving of the first monitoring data stream comprising the plurality of first records, each first record comprising a first transaction identifier and first monitoring data, the first transaction identifier relating to a first transaction, and the first monitoring data relating to a performance of executing the first transaction, the first monitoring data stream relating to the server, comprises:
receiving the first monitoring data stream comprising the plurality of first records, each first record comprising the first transaction identifier, a partition identifier, and the first monitoring data, the first transaction identifier relating to the first transaction, the partition identifier relating to the partition on which the first transaction has been executed, the first monitoring data relating to the performance of executing the first transaction on the partition, the first monitoring data stream relating to the server;
wherein the merging the buffered first monitoring data stream and second monitoring data stream by computing an outer-join with a join-condition that the first plurality of records from the first monitoring data stream have the first transaction identifier that occurs in the list of second transaction identifiers of the plurality of second records from the second data monitoring data stream to provide a merged data stream, comprises:
pre-processing the buffered first monitoring data stream by generating a pre-processed first monitoring data stream,
pre-aggregating the pre-processed first monitoring data stream by aggregating by the first transaction identifier to abstract away from partition-specific level-of-detail in the first monitoring data for yielding a pre-processed and pre-aggregated first data stream, and
processing the pre-processed and the pre-aggregated first data stream and the buffered second data stream.

11. A system, comprising:
a database server device outputting a first monitoring data stream comprising a plurality of first records, each first record comprising a first transaction identifier and first monitoring data, the first transaction identifier relating to a first transaction, and the first monitoring data relating to a performance of executing the first transaction;
at least one client device outputting a second monitoring data stream comprising a plurality of second records, each second record comprising a list of second transaction identifiers and second monitoring data, the list of second transaction identifiers relating to one or more second transactions, and the second monitoring data relating to a performance of executing the second transactions;
a monitoring server device configured to receive the first monitoring data stream and the second monitoring data stream, buffer at least parts of the first monitoring data stream and the second monitoring data stream, and merge the buffered first monitoring data stream and the second monitoring data stream by computing an outer-join with a join-condition that the first plurality of records from the first monitoring data stream have the first transaction identifier that occurs in the list of second transaction identifiers of the plurality of second records from the second monitoring data stream to provide a merged data stream.

12. The system of claim 11, wherein the monitoring server device is further configured to:
split the merged data stream into at least two streams, the at least two streams comprising a stream of matched records from the first monitoring data stream and the second monitoring data stream.

13. The system of claim 12, wherein the monitoring server device configured to split the merged data stream into at least two streams, the at least two streams comprising the stream of matched records from the first monitoring data stream and the second monitoring data stream is further configured to:
split the merged data stream into three streams, comprising: a first stream with unmatched records from the first monitoring data stream, a second stream with matched records from the first and second monitoring data streams, and a third stream with unmatched records from the second monitoring data stream.

14. The system of claim 12, wherein the monitoring server device is further configured to:
aggregate records of the at least two streams independently to provide aggregate records comprising aggregated monitoring data.

15. The system of claim 11, wherein the monitoring server device configured to buffer the at least parts of the first monitoring data stream and the second monitoring data stream, is further configured to:
buffer the first monitoring data stream and the second monitoring data stream for a predetermined time period.

16. The system of claim 11, wherein the monitoring server device configured to buffer the at least parts of the first monitoring data stream and the second monitoring data stream, is further configured to:
buffer the first monitoring data stream and the second monitoring data stream for an adjustable time period.

17. The system of claim 11, wherein the monitoring server device configured to buffer the at least parts of the first monitoring data stream and the second monitoring data stream, is further configured to:
buffer the first monitoring data stream and the second monitoring data stream at most for a predetermined time period, wherein the matched records from the first monitoring data stream and the second monitoring data stream are removed from the buffer when the matched records are found.

18. The system of claim 11, wherein the first monitoring data stream comprises first connection attributes and first performance metrics.

19. The system of claim 11, wherein the second monitoring data stream comprises second connection attributes and second performance metrics.

20. The system of claim 11, wherein
the database server device comprises a plurality of partitions, wherein the first monitoring data stream comprising the first plurality of records, each first record comprising the first transaction identifier, a partition identifier, and the first monitoring data, the first transaction identifier relating to the first transaction, the partition identifier relating to the partition on which the first transaction has been executed, the first monitoring data relating to the performance of executing the first transaction on the partition;

wherein the monitoring server device configured to merge the buffered first monitoring data stream and the second monitoring data stream by computing the outer-join with the join-condition that the plurality of first records from the first monitoring data stream have a first transaction identifier that occurs in the list of second transaction identifiers of the plurality of second records from the second monitoring data stream to provide for the merged data stream, is further configured to:
  pre-process the buffered first monitoring data stream by generating a pre-processed first monitoring data stream,
  pre-aggregate the pre-processed first monitoring data stream by aggregating by the first transaction identifier to abstract away from partition-specific level-of-detail in the first monitoring data for yielding a pre-processed and pre-aggregated first data stream, and
  process the pre-aggregated first data stream and the buffered second data stream.

21. A computer program product for merging monitoring data streams from a server and at least one client of the server, the computer program product comprising:
  a computer readable storage device having computer readable program code embodied therewith, the computer readable program code configured to:
    receive a first monitoring data stream comprising a plurality of first records, each first record comprising a first transaction identifier and first monitoring data, the first transaction identifier relating to a first transaction, and the first monitoring data relating to a performance of executing the first transaction, the first monitoring data stream relating to the server;
    receive a second monitoring data stream comprising a plurality of second records, each second record comprising a list of second transaction identifiers and second monitoring data, the list of second transaction identifiers relating to one or more second transactions, and the second monitoring data relating to a performance of executing the second transactions, the second monitoring data stream relating to the at least one client;
    buffer at least parts of the first monitoring data stream and the second monitoring data stream; and
    merge the buffered first monitoring data stream and second monitoring data stream by computing an outer-join with a join-condition that the first plurality of records from the first monitoring data stream have the first transaction identifier that occurs in the list of second transaction identifiers of the plurality of second records from the second data monitoring data stream to provide a merged data stream.

22. The computer program product of claim 21, the computer readable program code is further configured to:
  split the merged data stream into at least two streams, the at least two streams comprising a stream of matched records from the first monitoring data stream and the second monitoring data stream.

23. The computer program product of claim 22, wherein the computer readable program code configured to split the merged data stream into the at least two streams, the at least two streams comprising the stream of matched records from the first monitoring data stream and the second monitoring data stream, is further configured to:
  split the merged data stream into three streams comprising:
    a first stream with unmatched records from the first monitoring data stream, a second stream with matched records from the first and second monitoring data streams, and a third stream with unmatched records from the second data stream.

24. The computer program product of claim 22, wherein the computer readable program code is further configured to:
  aggregate records of the at least two streams independently to provide aggregate records comprising aggregated monitoring data.

25. The computer program product of claim 21, wherein the server comprises a plurality of partitions,
  wherein the computer readable program code configured to receive the first monitoring data stream comprising the plurality of first records, each first record comprising a first transaction identifier and first monitoring data, the first transaction identifier relating to a first transaction, and the first monitoring data relating to a performance of executing the first transaction, the first monitoring data stream relating to the server, is further configured to:
    receive the first monitoring data stream comprising the plurality of first records, each first record comprising the first transaction identifier, a partition identifier, and the first monitoring data, the first transaction identifier relating to the first transaction, the partition identifier relating to the partition on which the first transaction has been executed, the first monitoring data relating to the performance of executing the first transaction on the partition, the first monitoring data stream relating to the server;
  wherein the computer readable program code configured to merge the buffered first monitoring data stream and second monitoring data stream by computing an outer-join with a join-condition that the first plurality of records from the first monitoring data stream have the first transaction identifier that occurs in the list of second transaction identifiers of the plurality of second records from the second data monitoring data stream to provide a merged data stream, is further configured to:
    pre-process the buffered first monitoring data stream by generating a pre-processed first monitoring data stream,
    pre-aggregate the pre-processed first monitoring data stream by aggregating by the first transaction identifier to abstract away from partition-specific level-of-detail in the first monitoring data for yielding a pre-processed and pre-aggregated first data stream, and
    process the pre-processed and the pre-aggregated first data stream and the buffered second data stream.

* * * * *